Oct. 5, 1926.
E. G. THORIN
1,601,891
PROCESS AND APPARATUS FOR PRODUCING ACETIC ACID FROM ACETALDEHYDE
Filed April 27, 1923
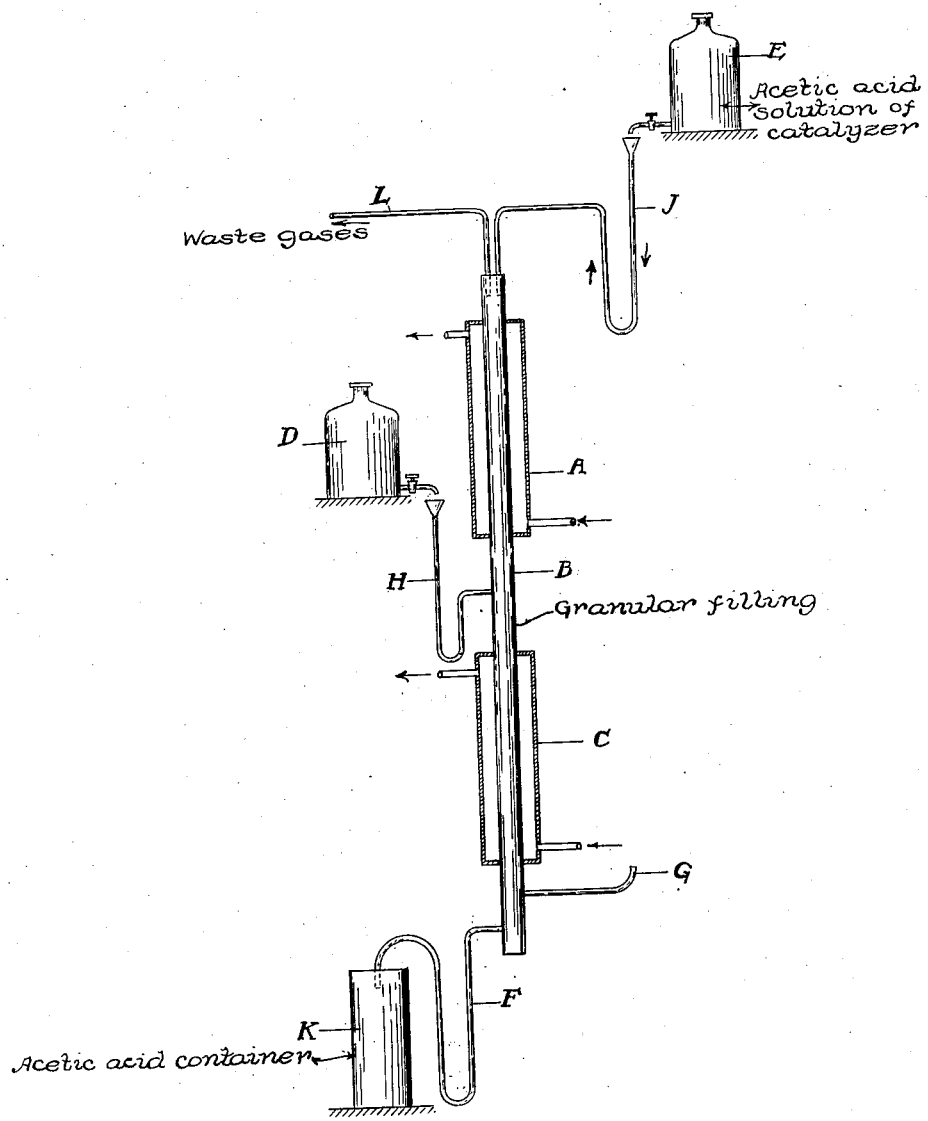
Inventor
E. G. Thorin Patented Oct. 5, 1926.

1,601,891

UNITED STATES PATENT OFFICE.

ERIK GUSTAF THORIN, OF MANSBO, AVESTA, SWEDEN, ASSIGNOR TO STOCKHOLMS SUPERFOSFAT FABRIKS AKTIEBOLAG, OF STOCKHOLM, SWEDEN, A CORPORATION OF SWEDEN.

PROCESSES AND APPARATUS FOR PRODUCING ACETIC ACID FROM ACETALDEHYDE.

Application filed April 27, 1923, Serial No. 635,106, and in Sweden September 19, 1921.

The manufacturing of acetic acid by the oxidation of acetaldehyde by means of either oxygen or air is, though in principle very simple, meets with several difficulties in practice, when carried out on a larger scale.

The danger of explosion is one of the greater difficulties. In several instances devastating explosions occurred, causing a shut down of the plant.

So far it has exclusively been assumed that the explosions are dependent upon the formation of peracetic acid and as a consequence numerous means have been suggested to prevent this. In the U. S. patent to Guyot No. 1,409,098 of 1922, it is proposed to add a catalyzer to the reacting liquid, making the formation of peracetic acid, at least in quantities large enough to cause explosion, impossible. It has also been proposed, according to the Swedish Patent No. 49135 (Compagnie des Produits Chimiques d'Alais & de la Camargue) to treat the product of reaction with heat causing the peracetic acid to decompose.

It has been proved, however, that explosions may occur, although the formation of peracetic acid is entirely prevented.

This is due to the fact that the danger of mixing oxygen gas or air with aldehyde vapors has not hitherto been taken into consideration. As a fact, in all known apparatus intended for carrying out the oxidation there are one or several relatively large gas spaces, filled with a mixture of acetaldehyde vapors and oxygen gas. There are several such gas spaces in the very complicated apparatus, described in the above mentioned Swedish Patent No. 49135. In the apparatus of said patent, there will always be large spaces in which the hot acetaldehyde vapors are mixed with oxygen gas. It is evident, that this mixture must be extremely liable to explosion and even the slightest cause may suffice to cause a disaster. Still more dangerous it will be, if according to some processes, for instance the one described in the British Patent No. 154368, the oxidation is to be carried out under high pressure.

The Swedish Patent No. 49135 exemplifies quite another difficulty especially conspicuous when carrying out the said oxidation in so called oxidizing columns. The temperature of reaction is not to be allowed to rise above $+75°$ C. If this temperature be exceeded, the yield of acetic acid will decrease due to the oxidation being driven too far. The acetaldehyde will in such a case burn so as to form carbon monoxide, carbon dioxide and water. In the last patent referred to, it will be quite impossible to maintain a suitable temperature in the pipe due to the considerable size of the same. As a fact, even if the filling material consists of a heat conducting metal, the inner parts of the column will always be warmer than the ones situated nearer the cooling surface. The reaction is namely in a high degree exothermic and due to the heat of reaction the tempearture is liable to exceed $+75°$ C. in the inner parts of the column.

My invention now is intended to oxidize acetaldehyde to acetic acid in oxidizing columns or other similar apparatus without the slightest danger of explosion, when running either at normal or at higher pressures. Furthermore, there is no risk in the acetaldehyde being oxidized to peracetic acid. As a matter of fact peracetic acid can not be formed in dangerous quantities, nor will on account of the construction of the apparatus explosions of the gas mixtures occur and finally, the temperature of reaction may easily be maintained at the desired value.

The purpose of my invention consists in bringing the components of reaction together in columns or other vessels filled with small pieces of solid material in such a way that said components get mixed only in the very small spaces between the pieces of the solid material. Thus all danger of explosion will be excluded. Other characteristic features of my invention are described in the following.

The apparatus used for carrying out the process consists of a tube or some other vessel filled with small pieces of solid material, the upper part of the apparatus being supplied with a cooling device, an inlet for liquid and an outlet for gases. Liquid acetaldehyde is to be introduced through a pipe at the middle portion of the apparatus. In the lower part of the same a heating arrangement is installed and in addition an inlet for gas containing oxygen as well as an outlet for acetic acid produced. The accompanying drawing is a diagrammatic view of an apparatus according to the present invention.

As shown on the drawing the apparatus may be built as a vertical tube at the upper part equipped with a water-jacket A at the lower part with a steam chamber C. The entire tube is filled with finely granulated aluminium, porous porcelain or other suitable material. The aldehyde is to be led from the container D through the liquor seal H, the plure oxygen gas or air being introduced through the pipe G. From the container E through a liquor seal installed at the upper part of the reaction vessel is to be introduced a solution or emulsion of a suitable catalyzer, such as manganese or sodium acetate, in acetic acid, or it may be merely pure acetic acid, if the oxidation is carried on without a catalyzer. The product formed will run off through the liquor seal F and be collected in the container K.

The oxidation of the acetaldehyde to acetic acid will take place mainly in the middle part B, where as shown on the drawing, the introduced acetaldehyde as well as the oxygen gas and, it may be, the catalyzer containing solution will meet each other. Any danger of explosion due to the mixing of aldehyde vapors and oxygen gas is entirely excluded as all parts of the apparatus are filled with small pieces of solid material, the oxygen gas thus being mixed with the acetaldehyde only in the very small spaces between the grains of the solid material. Finely granulated aluminium may be mentioned as a suitable filling material, but also other substances may be used, e. g. porous porcelain or charcoal.

The temperature in the middle zone B may easily be maintained at $+50—60°$ C., which temperature has been found to be the most suitable one, viz, bringing about the highest velocity of reaction at the same time causing a minimum of oxidation of the acetaldehyde. This is due to the fact partly that fresh quantities of cold acetaldehyde are continuously supplied and partly that a cold mixture of acetic acid and acetaldehyde flows down from the zone A said acetaldehyde being either condensed there or extracted by the acetic acid from E. In the reaction zone a mixture of acetaldehyde and acetic acid thus is obtained, above the boiling point of which the temperature can not rise. The temperature also may be made arbitrarily low by choosing a suitable proportion between the acetaldehyde and the acetic acid introduced into the apparatus.

The lower part of the column, equipped with the heating chamber is to be kept at about $+100°$ C. in order to vaporize the acetaldehyde which has not been oxidized and make it follow the oxygen gas into the water cooled zone. There it will condense or be extracted by the acetic acid or by the catalyzer containing solution from E and from here once more be conducted into the middle zone. The peracetic acid which may have been formed will in such a way be decomposed and the product running off through the pipe F will be free from aldehyde as well as from peracetic acid.

Oxygen gas which has not been consumed in the process or the remaining gases obtained, when air is used for the oxidation are to be carried off through the pipe L. Prior to that they have been carefully cleaned from acetaldehyde by cooling and washing in the tube A. By this means it will be possible to recover all acetaldehyde. The acetic acid or the catalyzer containing solution continuously introduced through J will act as a wash liquor, and at the same time the filling material in the tube will make a minute washing possible due to the increased surface of contact.

The process is entirely continuous and unlimited quantities of aldehyde may be converted into acetic acid without stopping, which from a technical point of view is of the greatest importance.

I claim:

1. An apparatus for oxidizing acetaldehyde to acetic acid consisting of an upright tube completely filled with small pieces of solid material, so as to prevent large air spaces, the upper part of the said tube being equipped with a cooling means to condense the vapors of the acetic acid and acetaldehyde, the lower part of the said tube being equipped with a heating means to drive off the acetaldehyde from the acetic acid, an outlet for the waste gases and an inlet for the admission of acetic acid at the top of the tube above the cooling means, an inlet for liquid acetaldehyde between the heating and cooling means and an outlet for the acetic acid formed and an inlet for the oxygen containing gas below the heating means at the lower end of the tube.

2. The process of making acetic acid from acetaldehyde which comprises introducing liquid acetaldehyde into the mid portion of a vertical column filled with small pieces of material to prevent large spaces in which an explosive mixture may form, introducing acetic acid at the upper portion of the column and an oxygen containing gas at the bottom portion of the column, causing the descending liquid to pass through a heating zone in the lower part of the column below the inlet of the acetaldehyde so as to cause vaporization of the unreacted acetaldehyde and decomposition of the peracetic acid, and causing the ascending gases to pass through a cooling zone at the upper portion of the tower above the inlet of the acetaldehyde where they will meet a descending flow of acetic acid which will absorb and recover the unoxidized acetaldehyde from the gases, removing the waste gases at the top of the column and removing the acetic acid at the bottom of the column.

3. The process according to claim 2 in which the acetic acid introduced at the top of the column contains a catalyst.

In testimony whereof I have affixed my signature.

ERIK GUSTAF THORIN.